(12) United States Patent
Rosen et al.

(10) Patent No.: US 6,398,118 B1
(45) Date of Patent: Jun. 4, 2002

(54) THERMOSTAT INCORPORATING THIN FILM CARBON DIOXIDE SENSOR AND ENVIRONMENTAL CONTROL SYSTEM

(76) Inventors: Howard B. Rosen, 1 Lyncroft Rd., Montreal, Quebec (CA), H3X 3E3; Steven D. Dushane, 17170 los Alimos St., Granada Hills, CA (US) 91344

( * ) Notice: Subject to any disclaimer, the term of this patent is extended or adjusted under 35 U.S.C. 154(b) by 0 days.

(21) Appl. No.: 09/240,506

(22) Filed: Jan. 29, 1999

(51) Int. Cl.$^7$ .................................................. F24F 7/00
(52) U.S. Cl. ...................... 236/49.3; 73/31.05; 165/248; 454/257
(58) Field of Search ..................... 73/31.05; 236/49.3, 236/11; 454/256, 257, 258, 239, 342; 165/248, 249

(56) References Cited

U.S. PATENT DOCUMENTS

| | | | |
|---|---|---|---|
| 4,211,362 A | * 7/1980 | Johnson | 236/47 |
| 4,326,200 A | * 4/1982 | Bushman | 73/31.05 X |
| 5,775,406 A | * 7/1998 | Ghitea, jr. | 165/248 X |
| 5,971,067 A | * 10/1999 | Rayburn | 165/217 |

OTHER PUBLICATIONS

S. Azad, S.A. Akbar, S.G. Mhaisalkar, L.D. Birkefeld and K.S. Goto, Journal of the Electrochemical Society, 139, 3690–3704 (1992).

* cited by examiner

Primary Examiner—William Wayner
(74) Attorney, Agent, or Firm—David T. Bracken

(57) ABSTRACT

A system for monitoring and modifying the quality and temperature of air within a conditioned space includes a blower unit, a damper unit for selectively admitting outside air into the conditioned space, a temperature moderating unit and a control unit. The control unit includes a thermostat and conventional temperature control apparatus for selectively activating the temperature moderating unit to maintain the desired temperature in the conditioned space. The control unit also incorporates $CO_2$ concentration measuring and control apparatus which includes a small $CO_2$ sensor. The $CO_2$ sensor includes a cathode, an anode and a solid electrolyte disposed intermediate and electrically in contact with each of the cathode and the anode to effect a primary electrical cell. A heater and a heater thermostat serve to maintain the temperature of the cell at about 250° C. The cathode and anode materials and the chemical composition of the electrolyte are further selected such that the voltage generated across the heated cell varies in accordance with the $CO_2$ concentration. $CO_2$ concentration modifying apparatus is responsive to sensing a first predetermined $CO_2$ concentration for turning on the blower unit and to sensing a second, higher, predetermined $CO_2$ concentration for actuating the damper unit to admit outside air.

10 Claims, 4 Drawing Sheets

US 6,398,118 B1

THERMOSTAT INCORPORATING THIN FILM CARBON DIOXIDE SENSOR AND ENVIRONMENTAL CONTROL SYSTEM

FIELD OF THE INVENTION

This invention relates to the art of conditioning indoor living and working and other enclosed public spaces. More particularly, this invention relates to a system in which the carbon dioxide ($CO_2$) level is monitored and controlled by apparatus in which the $CO_2$ sensor and support circuitry is integral with a thermostat which also serves to conventionally control the temperature range within the conditioned space.

BACKGROUND OF THE INVENTION

The ever increasing cost of energy has resulted, in recent years, in the construction of homes and buildings which are very well insulated and, further, which carefully provide for keeping the air within the home or building well isolated from the encroachment of outdoor air. This latter feature serves to limit the adverse effect of outdoor air on the desired temperature intended to be maintained within the building occasioned by direct mixing with the indoor air, an effect which is in addition to and independent of the limitation of adverse conduction effects afforded by insulating the conditioned spaces.

However, it has been observed that these highly-efficient, substantially closed, environmental conditioning systems have a serious drawback which can even reach dangerous levels. Because of the natural breathing processes of the occupants of a closed conditioned space and, in some instances, because of the effects-of combustion or similar processes, the concentration level of oxygen ($O_2$) decreases while the concentration of carbon dioxide ($CO_2$) increases. It has been found that when the concentration of $CO_2$ in a conditioned space reaches on the order of 1000 parts per million, breathing becomes noticeably more labored and difficult, particularly for those with breathing problems. Higher concentrations exacerbate these problems and can reach dangerous levels.

Accordingly, recommended maximum allowable concentrations of $CO_2$ for living and working spaces have been formulated and promulgated, and, in some instances, various government agencies have imposed requirements that specify the maximum concentration of $CO_2$ which will be allowed in public conditioned spaces.

Commercial $CO_2$ detectors have been both bulky and have required fairly sophisticated support circuitry because the voltages (or other electrical parameter) generated by or measured across the conventional $CO_2$ sensors, which vary in accordance with changes in $CO_2$ concentration, do so only across a very narrow, low level range. One commonly used $CO_2$ sensor in $CO_2$ detectors constitutes an IR light source directed at an IR light sensor such that the $CO_2$ concentration between the source and sensor subtly affects the response of the source. As a result, the support circuitry has to be able to interpret a suitably compensated signal (for example, for temperature and/or humidity variations) which may change only be a few microvolts across the entire measurement range. It will be apparent that such a $CO_2$ sensor and its support circuitry cannot be integrated with a temperature sensing and control system in a single, compact environmental control unit housing. It will also be apparent to those skilled in the art that such a $CO_2$ sensor cannot be integrated with substantially all the circuitry and components of both the $CO_2$ detection subsystem and the temperature sensing and control subsystem into a single integrated circuit.

It is to overcoming these drawbacks of prior art space conditioning control systems which incorporate a $CO_2$ concentration control feature that the present invention is directed.

OBJECT OF THE INVENTION

It is therefore a broad object of this invention to provide an improved $CO_2$ detector which is sufficiently compact and simple as to be suitable for integration with a thermostat in a single housing.

It is a more specific object of this invention, in a presently preferred embodiment, to incorporate a small, heated, electro-chemical $CO_2$ sensor in such an improved $CO_2$ detector.

SUMMARY OF THE INVENTION

Briefly, these and other objects of the invention are achieved in a system for monitoring and modifying the quality and temperature of air within a conditioned space which includes a blower unit, a damper unit for selectively admitting outside air into the conditioned space, a temperature moderating unit and a control unit. The control unit includes a thermostat including a conventional, manually operable, temperature set point adjustment and temperature control apparatus for selectively activating the temperature moderating unit when the temperature of the conditioned space deviates by a predetermined amount from the established temperature set point. The control unit further incorporates integrated $CO_2$ concentration measuring and control apparatus for the conditioned space which includes a small $CO_2$ sensor. In a presently preferred embodiment, the $CO_2$ sensor consists of a cathode disposed on a substrate, an anode disposed on the substrate spaced from the cathode and a solid electrolyte disposed on the substrate intermediate and electrically in contact with each of the cathode electrode and the anode to effect a primary electrical cell. A heater and a heater thermostat are also disposed on the substrate and are connected to a source of electrical energy to maintain the primary electrical cell within a predetermined temperature range on the order of 250° C. The metals from which the cathode and anode are fabricated and the chemical composition of the electrolyte being further selected such that the voltage established between the cathode and the anode varies in accordance with the $CO_2$ concentration at the primary electrical cell when the temperature of the cell is within the predetermined temperature range. $CO_2$ concentration modifying apparatus is responsive 1) to the measurement of at least a first voltage level between the cathode and the anode, representing a first predetermined $CO_2$ concentration, for turning on the blower unit; and 2) to the measurement of at least a second voltage level between the cathode and the anode representing a second predetermined $CO_2$ concentration, higher than the first predetermined $CO_2$ concentration, for actuating the damper unit to admit outside air into the conditioned space.

In more simple, alternative configurations, either a blower unit only or a damper unit only may be the elements employed to control the $CO_2$ concentration in the conditioned space. In addition, the use of $CO_2$ concentration sensors (e.g., semiconductor $CO_2$ concentration sensors), suitable for integration with the thermostat, are contemplated in place of the electro-chemical cell.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
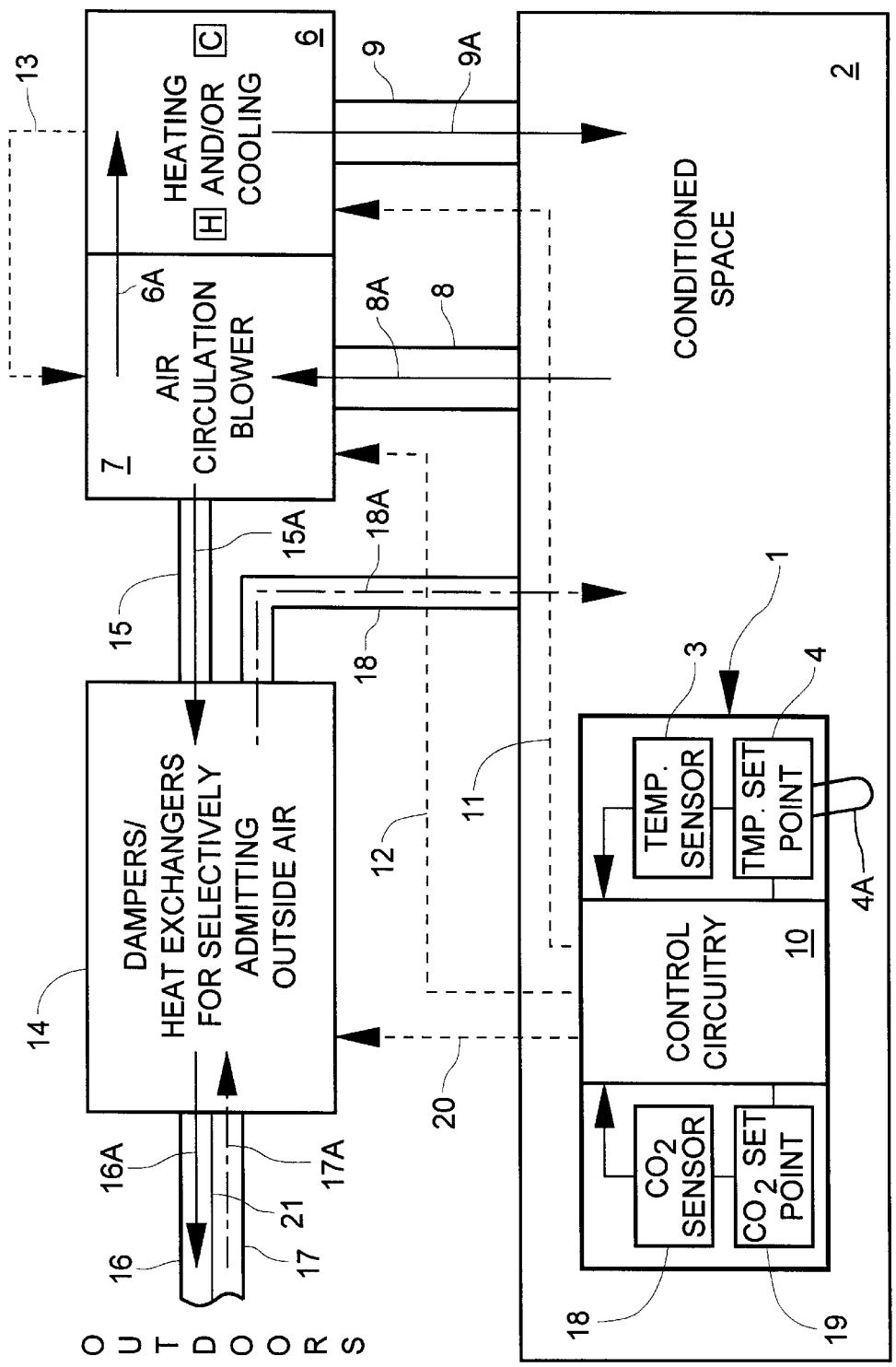
FIG. 1 is a high level block diagram illustrating an environment in which the present invention finds application.

Referring first to FIG. 1, an integrated thermostat/$CO_2$ level detector unit 1 is disposed within a conditioned space 2. The integrated unit 1 encloses both a conventional temperature sensor 3, an adjustable set point device 4 and control circuitry 5 which issues suitable control signals to heating and/or cooling unit 6 (generically, a temperature moderating unit) and blower unit 7 which serves to withdraw air from the conditioned space via conduit(s) 8 (represented by the arrow 8A), selectively force the air taken in through the heating and/or cooling unit 6 (represented by the arrow 6A) and back to the conditioned space 2 via conduit(s) 9 (represented by the arrow 9A).

Conventionally, control circuitry 10 reads the set point 4, typically established by manually adjusting movable element 4A, and the temperature in the conditioned space 2 is sensed by the sensor 3 in a manner which can be interpreted by the control circuitry 10 as representing a temperature which can be compared to the current set point. (Those skilled in the art will understand that most modern thermostats employ "up" and "down" buttons and a digital readout in place of the manually adjusting movable element 4A which is merely a generic representation of any suitable apparatus for effecting manual control of the desired temperature.) Control circuitry 10 issues control signals to the heating and/or cooling unit 6 and to the blower unit 7 via conductors 11 and 12, respectively in the well known manner. For example, if the system is operating in the heating mode, when the control circuit 10 reads the temperature sensor 3 as indicating that the temperature in the conditioned space has dropped below the established set point (or some predetermined offset therefrom), it sends a signal on the line 11 to the heating components H of the heating and/or cooling unit 6 which institutes the heating process. Typically, after the heating process has been on for a few seconds, the heating and/or cooling unit sends a signal, via line 13, to the blower unit 7 to start air circulation through the conditioning system to thereby transfer heat from the heating components H to the conditioned space 2. When the temperature sensor 3 indicates that the conditioned space has been sufficiently heated (typically, to one or two degrees F above the set point), the control circuitry 10 directs the heating process in the heating and/or cooling unit 6 to cease. Usually, the blower unit is allowed to continue to operate for a short period in order to extract the latent heat from the heating components H in the heating and/or cooling unit 6. In most heating and cooling systems, there is an option to independently manually control the blower unit 7 to run continuously or according to or taking into account some criteria other than the temperature of the working elements of the heating and/or cooling unit 6.

If the system is in the cooling mode, the system operates in a similar manner with the control circuitry 10 reading the temperature sensor 3 against the set point 4 and activating the cooling components C when the temperature in the conditioned space exceeds the set point (or some predetermined offset therefrom). Typically, air circulation is continued for a short period after the predetermined lower temperature of the conditioned space 2 has been reached in order to transfer additional heat to the cooling components C in the heating and/or cooling unit 6.

Those skilled in the art will appreciate that the temperature conditioning system for the conditioned space 2 so far described is entirely conventional and may be implemented in diverse variants (usually with more sophisticated control parameters and actions) from the elementary example described above which, however, provides a suitable environment for describing the invention.

It is known to monitor the $CO_2$ concentration in a conditioned space and, when the concentration of $CO_2$ reaches a predetermined level, to selectively admit outside air to lower the $CO_2$ level and accordingly raise the $O_2$ concentration to an acceptable level. However, in the past, this has been accomplished by the use of independent $CO_2$ detector units which are relatively bulky and also have low sensitivity to changes in $CO_2$ level. These drawbacks are eliminated by the subject invention as will be discussed below.

Still referring to FIG. 1, it will be observed that provision has also been made to selectively admit outside air into the conditioned space. Further, this feature can be controlled in accordance with the $CO_2$ level measured in the conditioned space 2. A damper/heat exchanger block 14 includes conventional damper apparatus for selectively closing off or admitting outside air into the conditioned space 2 via conduit 17 (represented by the arrow 17A), damper/heat exchanger unit 14 and conduit 18 (represented by the arrow 18A). Similarly, provision has been made to selectively transfer air from the conditioned space 2 to the outdoors via conduit 15 (represented by arrow 15A), damper/heat exchanger unit 14 and conduit 16 (represented by arrow 16A). As is well known in the art, heat can be transferred between the incoming outside air and the exhausted air from the conditioned space by coupling the respective conduits for conductive heat exchange. As an elementary example, a common wall 21 between the conduits 16, 17, if fabricated from a good heat conductor such as aluminum, steel or the like, serves as a simple heat exchanger for this purpose. Accordingly, if the conditioned space is being heated, some of the heat in the exhausted air can be used to raise the temperature of the incoming air; and if the conditioned space is being cooled, some of the heat in the exhausted air can be used to lower the temperature of the incoming air. It will be understood that more elaborate conventional heat exchange elements can be included in damper/heat exchanger unit 14 to further increase the efficiency of the system.

Figure 2:
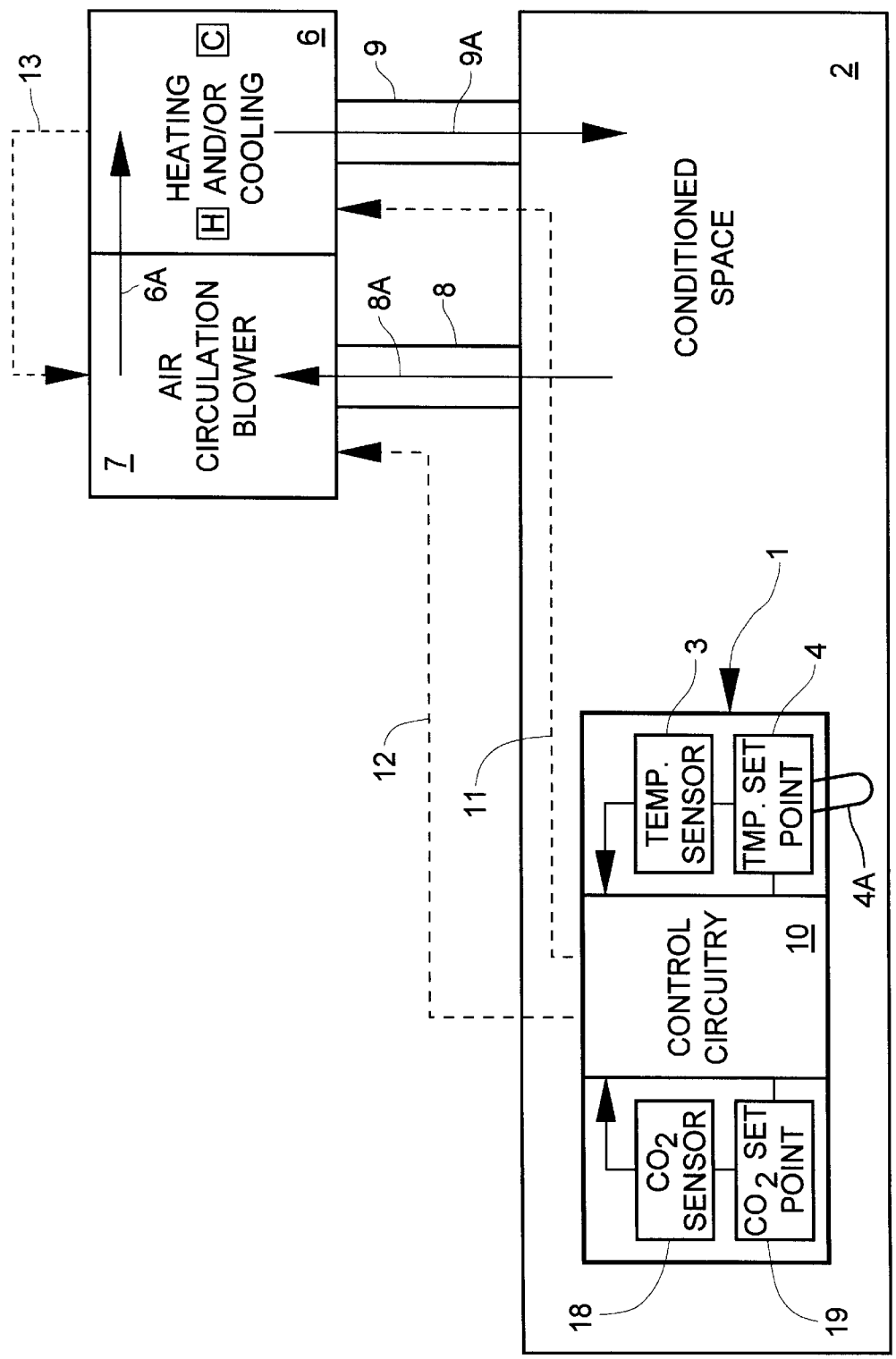
FIG. 2 is a high level block diagram illustrating a variant environment in which the present invention finds application.

Referring now to FIG. 2, in "leaky" buildings in which outside air routinely encroaches into the conditioned space (as, for example, by frequent opening of doors to the outside or by infiltration in a less completely sealed system), the $CO_2$ concentration in one building region, at which the integrated thermostat/$CO_2$ level detector unit 1 is situated, may become unacceptably high while remaining acceptable in other regions within the same heating/cooling system. In such an environment, it is not (or may not be) necessary to rely upon the deliberate exchange of conditioned air for outside air. Rather, the blower unit 7 may simply be turned on by the control circuitry 10, via signal line 12, to mix the air throughout the conditioned space until the $CO_2$ level at the integrated thermostat/$CO_2$ level detector unit 1 drops below a predetermined level. It will be apparent that a plurality of integrated thermostat/$CO_2$ level detector units 1 can be distributed within such an environment with each such unit having the authority to actuate the blower unit 7 if the $CO_2$ concentration exceeds a predetermined level at a given unit.

As will be discussed further below, a system such as that shown in FIG. 1 which does provide for the selective admission of outside air can be operated to first only turn on the blower unit 7 when the sensed $CO_2$ concentration reaches a first concentration and to actuate the dampers in the dampers/heat exchangers unit 14 to admit outside air only if and when the sensed $CO_2$ concentration reaches a second, higher concentration, thereby limiting the necessity for taking in outside air with a consequent increase in energy efficiency.

Figure 3:
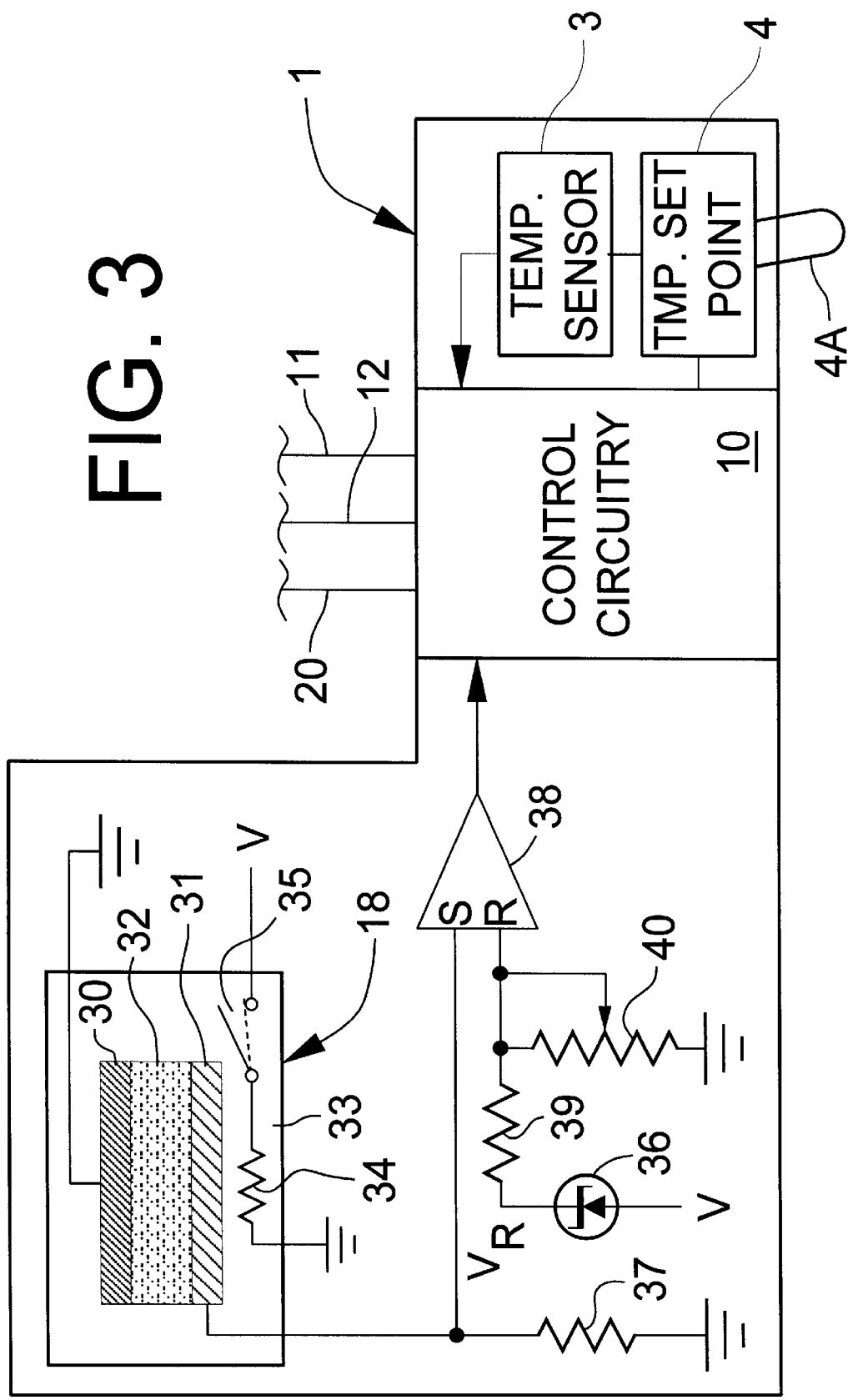
FIG. 3 is a more detailed partially block/partially schematic diagram of a presently preferred embodiment of the invention.

Referring now to FIG. 3, the $CO_2$ level detector is integrated in the same housing with the thermostat circuitry and similarly communicates with control circuitry 10 to provide supplementary control signals to the blower unit 7 and/or the damper/heat exchanger unit 14 as previously described. The $CO_2$ sensor 18 includes a reference electrode 30 and a sensor electrode 31 separated, physically and electrically, by an electrolyte region 32, all situated on a substrate 33. The electrodes 30, 31 are dissimilar metals selected from the oxidation-reduction table or suitable alloys which, when separated physically, but electrically coupled through an electrolyte, will establish a voltage across the electrodes. In short, an electro-chemical primary cell is obtained; the reference electrode 30 being the cathode, and the sensing electrode 31 being the anode in the example. The electrolyte 32 is a solid electrolyte such that the entire cell can be laid down on a substrate 33. Also disposed on the substrate 33 are a heater resistor 34 connected in series with a thermostat 35. The substrate 33 is selected for good thermal communication among the several components constituting the CO2 sensor 18. As a practical matter and as will become more apparent below, because the load on the cell is very small, the cell itself, can be commensurately small such that it is physically very much smaller than shown in FIG. 3, the cell being greatly enlarged therein in order to more readily explain the invention.

The reference electrode 30 is connected to reference ground, and the sensor electrode 31 is connected to one end of a resistor 37 and also to a signal input (S) of a differential amplifier 38. The other end of the resistor 37 is connected to reference ground. A voltage source V (from, for example, the battery or other power source within the integrated thermostat/$CO_2$ level detector unit 1) is regulated to a reference voltage $V_R$ by a Zener diode 36. The second, reference, input (R) to the differential amplifier 38 is connected to the junction between a resistor 39 and a variable resistor 40. The other end of the resistor 39 is connected to $V_R$, and the other end of the variable resistor 40 is connected to reference ground.

The principle of operation of the $CO_2$ sensor 18 is that, when the cell assembly is heated to a temperature of on the order of 250° C., the voltage developed across the cell constituting the cathode 30, anode 31 and solid electrolyte 32 becomes susceptible to readily measurable change in accordance with the $CO_2$ concentration at the cell. This known effect appears to be due to a chemical reaction between the $CO_2$ and the electrolyte which must be selected to enhance the extent of the change in accordance with the gas of interest. Combinations of electrodes and electrolytes suitable for the purpose are discussed, for example, by S. Azad, S. A. Akbar, S. G. Mhaisalkar, L. D. Birkefeld and K. S. Goto in the *Journal of the Electrochemical Society*, 139, 3690 (1992). One suitable combination which gives very good results for measuring $CO_2$ concentration is: platinum (Pt) for the cathode, reference electrode 30; silver (Ag) for the anode, sensing electrode 31; and a mixture of $Na_2CO_3$, $BaCO_3$ and $AG_2SO_4$ as the solid electrolyte.

Thus, the heater thermostat 35 is set to selectively activate the heater 34 to maintain the sensor 18 within the range of 225° C. to 275° C. and preferably at about 250° C. The entire $CO_2$ sensor assembly should be made physically small and the thicknesses of the electrodes 30, 31 very thin in order to minimize the mass which has to be maintained at about 250° C. Accordingly, the heating is very localized and does not affect the rest of the circuitry in the entire structure and, further, does not draw an extraordinary amount of current from the power source V.

The voltage appearing at the signal input to the differential amplifier 38 is that appearing at the reference electrode 31. The voltage appearing at the reference input to the differential amplifier 38 is established by adjustment of the adjustable resistor 40, this preferably being a "factory" adjustment which is not available for change to the user. (Those skilled in the art will understand that suitable selection of a fixed value for the resistor 40 with respect to the value of the resistor 39 and the characteristics of the differential amplifier 38 can eliminate the need to use a more expensive variable resistor for the resistor 40. Alternatively, the resistor 39 can be eliminated by applying $V_R$ to one end of variable resistor 40 and connecting only its tap to the reference input to the differential amplifier. Further, if the power source V is selected to supply a suitably stable voltage, the Zener diode 36 can be eliminated to simplify the circuitry and also decrease the load on the power source. These are all routine engineering considerations within the purview of those skilled in the art.)

At the exemplary operating temperature of about 250° C., the exemplary cell has a substantially linear sensitivity falling, as to an individual unit, within the range of about 40–55 millivolts per decade of $CO_2$ concentration. This is a voltage change range at a level which can be readily processed by inexpensive integrated circuit components such as the differential amplifier 38. Individual units can be calibrated and adjusted by use of the adjustable resistor 40 if necessary; however, by employing careful fabrication techniques, it is possible to replicate individual units with sufficiently uniform characteristics that individual unit calibration is not necessary.

Thus, the voltage output of the differential amplifier is representative of the $CO_2$ concentration at the $CO_2$ sensor 18 and can therefore be compared, by conventional circuits within the control circuitry 10, against predetermined voltage levels which, if exceeded, call for independently turning on the blower unit 7 to circulate the air in the conditioned space under control and/or independently opening the dampers in the damper/heat exchanger unit 14 to admit outside air. A flow chart showing the operation of the $CO_2$ detector and related control functions of the system illustrated in FIG. 1 is presented in FIG. 4. It will be noted that one efficient operation mode is to start the blower unit when a first $CO_2$ concentration (for example, about 800 PPM) is sensed and, if necessary, actuate the damper/heat exchanger unit 14 to admit outside air when a higher $CO_2$ concentration (for example, about 900 PPM) is sensed. In the example, when the $CO_2$ concentration drops below about 850 PPM, the dampers are closed (if open only to effect $CO_2$ concentration control). Similarly, when the $CO_2$ concentration drops below about 700 PPM, the blower is turned off (if on only because of $CO_2$ concentration control; e.g., it could be on because of temperature control).

Figure 4:
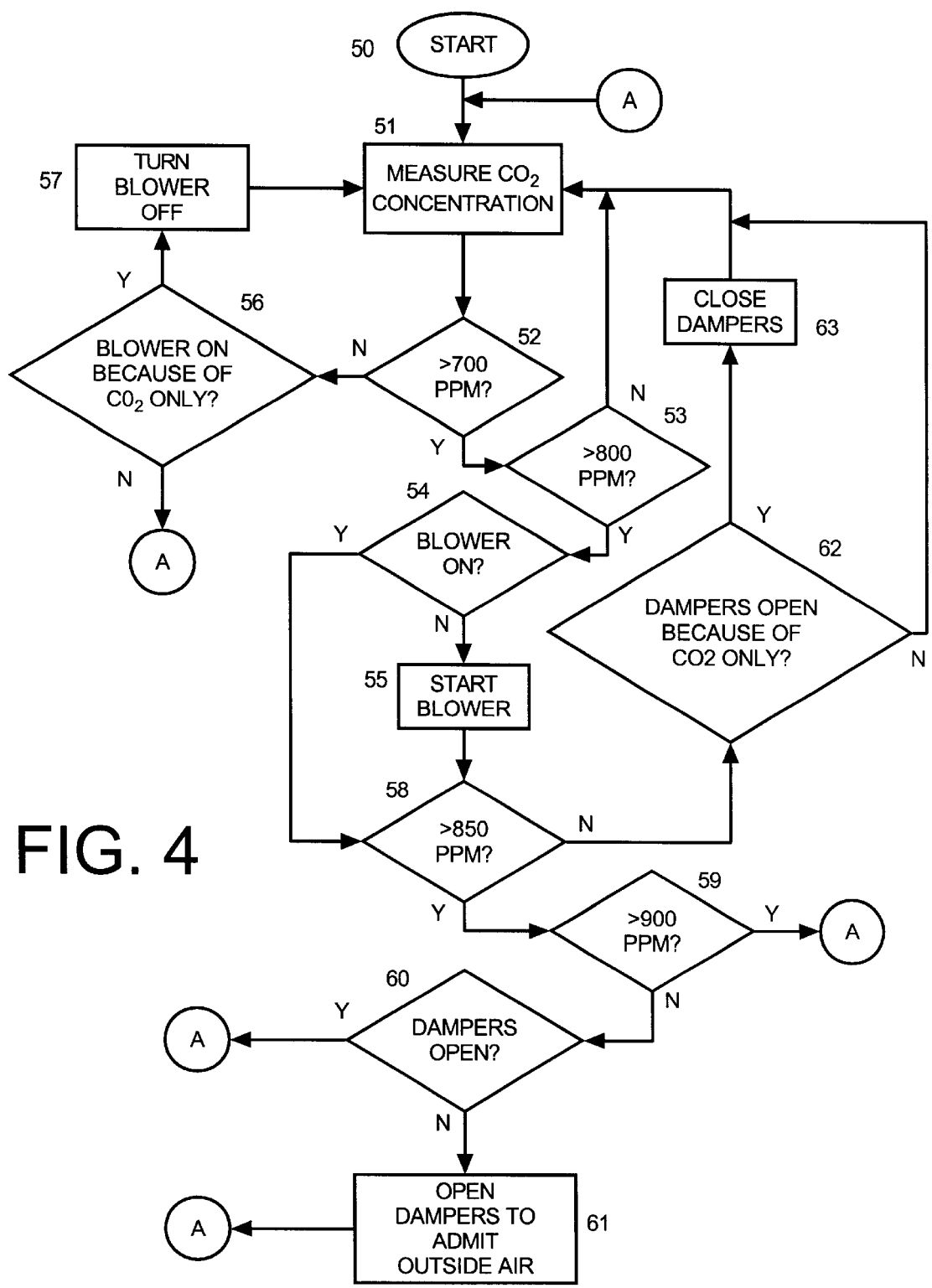
FIG. 4 is a flowchart defining the operation of the $CO_2$ detector and its associated circuitry.

However, those skilled in the art will appreciate that FIG. 4 illustrates only one of several possible operating modes. For example, for use in a system such as that shown in FIG. 2 which does not incorporate apparatus for selectively admitting outside air into the conditioned space, steps 58–63 would be eliminated, and both the Y exit of step 54 and the exit from step 55 would return to A.

Because the exemplary $CO_2$ detector and its associated circuitry is small and requires little power (notwithstanding the heating function), a very few integrated circuits, a hybrid circuit or even a single integrated circuit, can be fabricated and employed for effecting all the temperature control and $CO_2$ level control operations of the integrated thermostat/$CO_2$ level detector unit 1 which can therefore be provided as a single unit in a small housing.

It is contemplated that other $CO_2$ sensors suitably small for integration with a thermostat can be employed in the invention. For example, a semiconductor structure sensitive to $CO_2$ concentration and which does not require a heater can be used in place of the electro-chemical electrical cell described above as the $CO_2$ concentration sensor with suitable conventional revision of its support circuitry to obtain equivalent control signals and functions.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A system for monitoring and modifying the quality and temperature of air within a conditioned space which includes a blower unit, a temperature moderating unit and a control unit, said control unit comprising:
    A) a thermostat including temperature set point establishment means and temperature control means for selectively activating said temperature moderating unit when the temperature of the conditioned space deviates by a predetermined amount from the established temperature set point; and
    B) $CO_2$ concentration measuring and control apparatus for the conditioned space, said $CO_2$ concentration measuring and control apparatus comprising:
        1) a $CO_2$ sensor comprising:
            a) a cathode electrode disposed on a substrate and fabricated from a first metal;
            b) an anode electrode disposed on the substrate spaced from said cathode electrode, said anode electrode being fabricated from a second metal, said first and second metals being selected to have different oxidation-reduction values;
            c) a solid electrolyte disposed on the substrate intermediate and electrically in contact with each of said cathode electrode and said anode electrode such that said cathode electrode, said anode electrode and said solid electrolyte effect a primary electrical cell;
            d) a heater disposed on the substrate;
            e) a heater thermostat disposed on the substrate and connected to said heater and to a source of electrical energy so as to maintain said primary electrical cell within a predetermined temperature range;
            f) said first metal, said second metal and the chemical composition of said electrolyte being further selected such that the voltage established between said cathode and said anode varies in accordance with the $CO_2$ concentration at said primary electrical cell when the temperature of said primary electrical cell is within said predetermined temperature range; and
        2) $CO_2$ concentration modifying apparatus responsive to the measurement of at least a first voltage level between said cathode and said anode representing a first predetermined $CO_2$ concentration for turning on said blower unit.

2. The system of claim 1 in which said heater thermostat is set to maintain said electrical cell within the range of 225° C. to 275° C. and preferably at about 250° C.

3. The system of claim 2 in which said first metal is platinum, said second metal is silver and said solid electrolyte is a mixture of $Na_2CO_3$, $BaCO_3$ and $AG_2SO_4$.

4. A system for monitoring and modifying the quality and temperature of air within a conditioned space which includes a damper unit for selectively admitting outside air into the conditioned space, a temperature moderating unit and a control unit, said control unit comprising:
    A) a thermostat including temperature set point establishment means and temperature control means for selectively activating said temperature moderating unit when the temperature of the conditioned space deviates by a predetermined amount from the established temperature set point; and
    B) $CO_2$ concentration measuring and control apparatus for the conditioned space, said $CO_2$ concentration measuring and control apparatus comprising:
        1) a $CO_2$ sensor comprising:
            a) a cathode electrode disposed on a substrate and fabricated from a first metal;
            b) an anode electrode disposed on the substrate spaced from said cathode electrode, said anode electrode being fabricated from a second metal, said first and second metals being selected to have different oxidation-reduction values;
            c) a solid electrolyte disposed on the substrate intermediate and electrically in contact with each of said cathode electrode and said anode electrode such that said cathode electrode, said anode electrode and said solid electrolyte effect a primary electrical cell;
            d) a heater disposed on the substrate;
            e) a heater thermostat disposed on the substrate and connected to said heater and to a source of electrical energy so as to maintain said primary electrical cell within a predetermined temperature range;
            f) said first metal, said second metal and the chemical composition of said electrolyte being further selected such that the voltage established between said cathode and said anode varies in accordance with the $CO_2$ concentration at said primary electrical cell when the temperature of said primary electrical cell is within said predetermined temperature range; and 2) $CO_2$ concentration modifying apparatus responsive, to the measurement of at least a first voltage level between said cathode and said anode representing a first predetermined $CO_2$ concentration for actuating said damper unit to admit outside air into the conditioned space.

5. The system of claim 4 in which said heater thermostat is set to maintain said electrical cell within the range of 225° C. to 275° C. and preferably at about 250° C.

6. The system of claim 5 in which said first metal is platinum, said second metal is silver and said solid electrolyte is a mixture of $Na_2CO_3$, $BaCO_3$ and $AG_2SO_4$.

7. A system for monitoring and modifying the quality and temperature of air within a conditioned space which includes a blower unit, a damper unit for selectively admitting outside air into the conditioned space, a temperature moderating unit and a control unit, said control unit comprising:

A) a thermostat including temperature set point establishment means and temperature control means for selectively activating said temperature moderating unit when the temperature of the conditioned space deviates by a predetermined amount from the established temperature set point; and B) $CO_2$ concentration measuring and control apparatus for the conditioned space, said $CO_2$ concentration measuring and control apparatus comprising:
  1) a $CO_2$ sensor comprising:
    a) a cathode electrode disposed on a substrate and fabricated from a first metal;
    b) an anode electrode disposed on the substrate spaced from said cathode electrode, said anode electrode being fabricated from a second metal, said first and second metals being selected to have different oxidation-reduction values;
    c) a solid electrolyte disposed on the substrate intermediate and electrically in contact with each of said cathode electrode and said anode electrode such that said cathode electrode, said anode electrode and said solid electrolyte effect a primary electrical cell;
    d) a heater disposed on the substrate;
    e) a heater thermostat disposed on the substrate and connected to said heater and to a source of electrical energy so as to maintain said primary electrical cell within a predetermined temperature range;
    f) said first metal, said second metal and the chemical composition of said electrolyte being further selected such that the voltage established between said cathode and said anode varies in accordance with the $CO_2$ concentration at said primary electrical cell when the temperature of said primary electrical cell is within said predetermined temperature range; and
  2) $CO_2$ concentration modifying apparatus:
    a) being responsive to the measurement of at least a first voltage level between said cathode and said anode representing a first predetermined $CO_2$ concentration for turning on said blower unit; and
    b) being responsive to the measurement of at least a second voltage level between said cathode and said anode representing a second predetermined $CO_2$ concentration, higher than said first predetermined $CO_2$ concentration, for actuating said damper unit to admit outside air into the conditioned space.

8. The system of claim 7 in which said heater thermostat is set to maintain said electrical cell within the range of 225° C. to 275° C. and preferably at about 250° C.

9. The system of claim 8 in which said first metal is platinum, said second metal is silver and said solid electrolyte is a mixture of $Na_2CO_3$, $BaCO_3$ and $AG_2SO_4$.

10. A system for monitoring and modifying the quality and temperature of air within a conditioned space which includes a blower unit, a damper unit for selectively admitting outside air into the conditioned space, a temperature moderating unit and a control unit, said control unit comprising:

A) a thermostat including temperature set point establishment means and temperature control means for selectively activating said temperature moderating unit when the temperature of the conditioned space deviates by a predetermined amount from the established temperature set point;

B) $CO_2$ concentration measuring and control apparatus for the conditioned space, said $CO_2$ concentration measuring and control apparatus being integral with said thermostat; and C) $CO_2$ concentration modifying apparatus:
  1) being responsive to the measurement by said $CO_2$ concentration measuring and control apparatus of at least a first predetermined $CO_2$ concentration for turning on said blower unit; and
  2) being responsive to the measurement by said $CO_2$ concentration measuring and control apparatus of at least a second predetermined $CO_2$ concentration, higher than said first predetermined $CO_2$ concentration, for actuating said damper unit to admit outside air into the conditioned space.

* * * * *